(12) United States Patent
Saida

(10) Patent No.: US 8,891,093 B2
(45) Date of Patent: Nov. 18, 2014

(54) IMAGE FORMING APPARATUS

(75) Inventor: Yukihiro Saida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 209 days.

(21) Appl. No.: 13/427,972

(22) Filed: Mar. 23, 2012

(65) Prior Publication Data

US 2012/0243015 A1    Sep. 27, 2012

(30) Foreign Application Priority Data

Mar. 23, 2011    (JP) ................. 2011-063873

(51) Int. Cl.
| | | |
|---|---|---|
| *G03G 15/23* | (2006.01) | |
| *G06F 3/12* | (2006.01) | |
| *G06K 15/16* | (2006.01) | |
| *H04N 1/00* | (2006.01) | |
| *G06K 15/00* | (2006.01) | |

(52) U.S. Cl.
CPC ............ *G06K 15/16* (2013.01); *B65H 2511/30* (2013.01); *B65H 2513/50* (2013.01); *G03G 2215/00333* (2013.01); *H04N 1/00657* (2013.01); *G03G 15/231* (2013.01); *H04N 1/00578* (2013.01); *H04N 1/0058* (2013.01); *G03G 2215/00337* (2013.01)
USPC ......... 358/1.13; 358/1.14; 358/1.1; 358/1.12; 399/361

(58) Field of Classification Search
CPC . G03G 15/234; G03G 15/231; G03G 15/602; G03G 15/6529; H04N 1/00657; H04N 1/0058; H04N 1/00578; G06K 15/16
USPC .......... 399/361–376, 396, 401, 208; 358/444, 358/300, 412, 413, 1.5, 1.9, 420–423; 355/23, 24; 271/291, 287; 382/382
See application file for complete search history.

(56) References Cited

U.S. PATENT DOCUMENTS

| | | | | |
|---|---|---|---|---|
| 5,132,719 | A | * | 7/1992 | Kioka et al. .................... 355/24 |
| 5,337,135 | A | * | 8/1994 | Malachowski et al. ....... 399/401 |
| 5,893,020 | A | * | 4/1999 | Atsumi ......................... 399/364 |
| 6,081,687 | A | * | 6/2000 | Munemori et al. ........... 399/374 |
| 2007/0139690 | A1 | * | 6/2007 | Fukushima ................. 358/1.14 |

FOREIGN PATENT DOCUMENTS

| | | |
|---|---|---|
| JP | 2001-238022 A | 8/2001 |
| JP | 2004-085903 A | 3/2004 |
| JP | A-2009-154540 | 7/2009 |
| JP | 2010-276797 A | 12/2010 |

* cited by examiner

*Primary Examiner* — Chad Dickerson
(74) *Attorney, Agent, or Firm* — Muncy, Geissler, Olds & Lowe, P.C.

(57) ABSTRACT

An image forming apparatus includes a maximum document number decision part that decides a number of media that are carried simultaneously on a medium carrying path at the time of double sided printing, a memory part that stores image data of a document, a print data editing part that generates page data to be printed on the media from the image data in the memory part, a print page generation monitoring part that monitors a page data number generated by the print data editing part, a print start timing decision part that decides a print start timing from the number of media and the page data number, a print mechanism controller that starts printing based on the print start timing determined by the print start timing decision part.

6 Claims, 17 Drawing Sheets

IMAGE FORMING APPARATUS

CROSS REFERENCE TO RELATED APPLICATION

The present application is related to, claims priority from and incorporates by reference Japanese Patent Application No. 2011-063873, filed on Mar. 23, 2011.

TECHNICAL FIELD

The present application relates to an image forming apparatus.

BACKGROUND

An image forming apparatus, such as a printing device and the like, that performs double sided printing to print image data on each of the front side and back side of a single medium is conventionally provided. Such an image forming apparatus includes a double sided printing unit. When the double sided printing is performed, a medium is supplied from a sheet supply tray that accommodates the medium. After performing the printing on one side of the medium, the medium is temporarily held in the double sided printing unit. The medium, on one side of which the printing has been performed, is subsequently supplied from the double sided printing unit to perform the printing on the other side of the medium (see JP Laid-Open Patent Application No. 2009-154540).

However, in the conventional image forming apparatus, to perform the double sided printing, the printing starts when page data for one side and page data for the other side of a single medium are present. Therefore, if the page data for both sides of the next medium is not present at a timing when a supply of a medium printed on a single side from the double sided printing unit is completed, the interval between the media, that is, a sheet distance extends greatly. Therefore, when the speed of the double sided printing and the speed of reading a document image by an image reading part are the same, for example, the sheet distance extends greatly until the number of pages of the generated page data catches up to the number of pages of the page data used for the double sided printing. This causes an excess operation of the image forming part and an increase in power consumption. In addition, this reduces the life of the consumable items, the device and the like.

The present application solves problems of the above-described conventional image forming apparatus and has an object to provide an image forming apparatus that suppresses the power consumption even during the double sided printing by monitoring the generated page data and a timing for starting the printing, thereby extending the life of the consumable items, the device and the like.

SUMMARY

For the object, an image forming apparatus disclosed in the application includes a reading mechanism that includes a document reading part that reads an image of a document and that is capable of reading images of front and back sides of the document, a print mechanism that includes an image forming part that forms the image on a medium and that is capable of forming the images on front and back sides of the medium in a first double sided print mode and a second double sided print mode in which a distance between media is set shorter than the first double side print mode, a maximum document number decision part that decides a number of media that are carried simultaneously on a medium carrying path of the print mechanism at the time of double sided printing, a memory part that stores image data of the document read by the document reading part, a print data editing part that generates page data to be printed on the media from the image data stored in the memory part, a print page generation monitoring part that monitors a page data number generated by the print data editing part, a print start timing decision part that decides a print start timing from the number of media decided by the maximum document number decision part and the page data number monitored by the print page generation monitoring part, a print mechanism controller that starts printing based on the print start timing determined by the print start timing decision part.

According to the present application, the image forming apparatus determines a timing for starting the printing by monitoring the generated page data. In this case, the power consumption is suppressed, and the life of the consumable items, the device and the like is extended.

DETAILED DESCRIPTION OF EMBODIMENTS

Embodiments of the present application are explained in detail below with reference to the drawings.

Figure 1:
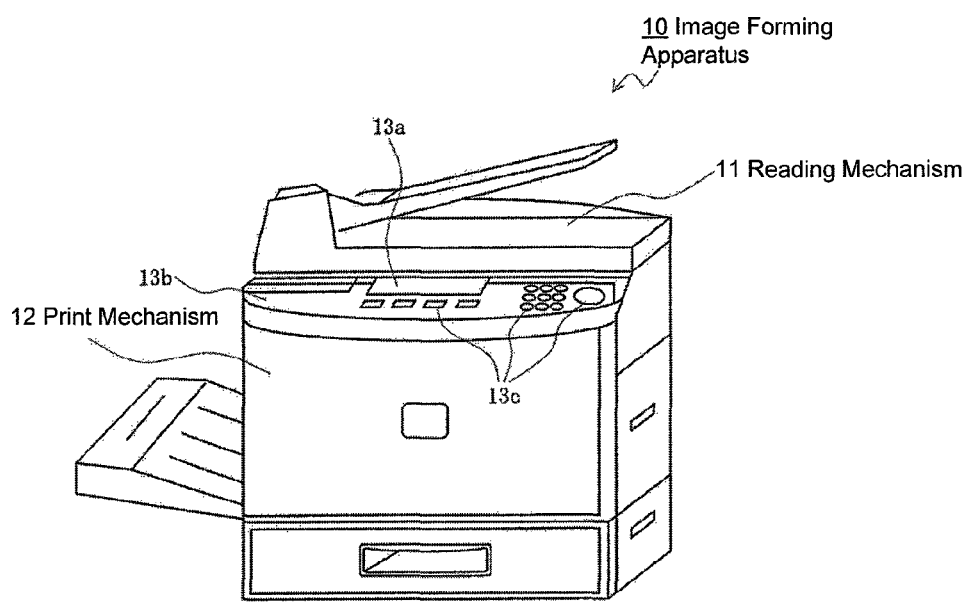
FIG. 1 is a perspective view illustrating an image forming apparatus according to a first embodiment of the present application.
Figure 2:
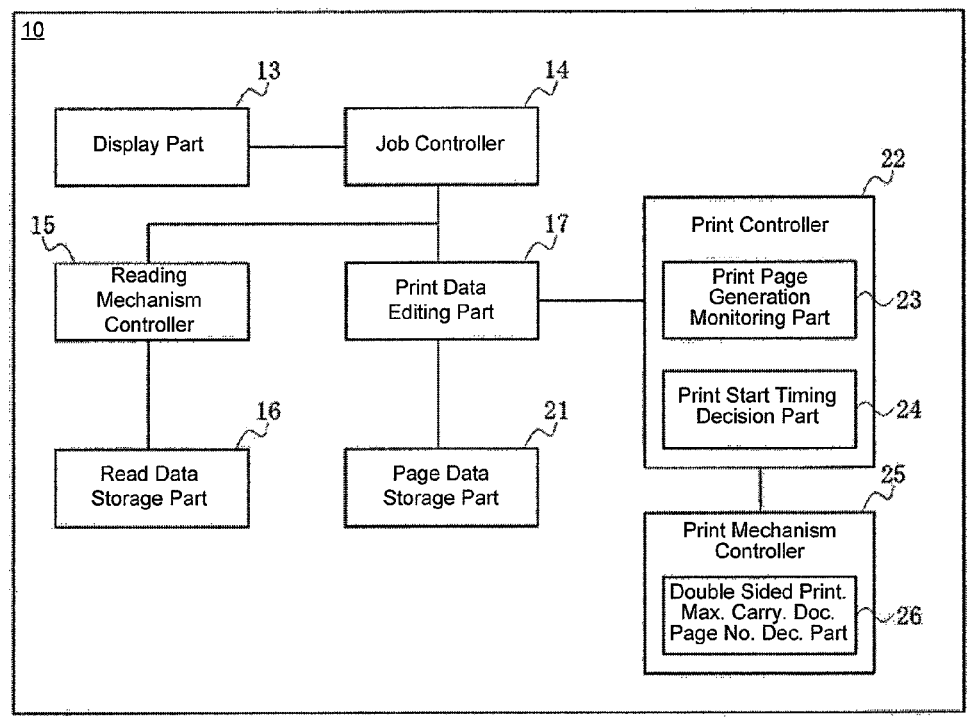
FIG. 2 is a block diagram illustrating a configuration of a control system of the image forming apparatus according to the first embodiment of the present application.

FIG. 1 is a perspective view illustrating an image forming apparatus according to a first embodiment of the present application. FIG. 2 is a block diagram illustrating a configuration of a control system of the image forming apparatus according to the first embodiment of the present application.

In the figure, reference numeral 10 is an image forming apparatus according to the present embodiment. The image forming apparatus 10 is a printer, facsimile machine, photocopy machine, a multi function peripheral having various functions, or the like, for example, but may be any types of devices. Here, the image forming apparatus 10 is explained to include at least a reading mechanism 11 as a scanner that reads an image of the later-discussed document 31, and a print mechanism 12 that includes a function as a printer that forms, by printing, the image on the later-discussed medium 61.

The image forming apparatus 10 may be connected to a host device, such as a personal computer, a server and the like (not shown) through a network, such as an intranet, a local area network (LAN), a wide area network (WAN), and the like. Here, the image forming apparatus 10 is explained to be connected to a host device. In addition, the print mechanism 12 performs the double sided printing that prints image data on each of the front and back sides of a single medium 61. Moreover, a print method used by the print mechanism 12 may be an inkjet method, a thermal transfer method, an electrographic method, and the like. However, any method may be used. Here, the electrographic method is used to enable formation of color images also.

In the present embodiment, the image forming apparatus 10 includes a display part 13 that displays a state of the device on a display section 13a and that monitors a switch 13c on an operation panel 13b, a job controller 14 that controls a copy function, a print function from the host device, and the like, a reading mechanism controller 15 as a reading part that reads an image of the document 31 by controlling the reading mechanism 11, a read data storage part 16 as a memory part that stores the document image read by the reading mechanism controller 15, a print data editing part 17 that generates page data as print data that is printable on the medium 61 from the image data stored in the read data storage part 16, a page data storage part 21 as a memory part that stores the page data generated by the print data editing part 17, a print controller 22, and a print mechanism controller 25.

The print controller 22 includes a print page generation monitoring part 23 that monitors a page data number generated by the print data editing part 17 based on a page generation notice sent by the print data editing part 17, and a print start timing decision part 24 that decides a timing for starting the printing based on the page data number monitored by the print page generation monitoring part 23 and a number of media 61 decided by a double sided printing maximum carrying document page number decision part 26 (maybe referred to as "maximum document page number decision part"). The print controller 22 starts the printing based on the print start timing determined by the print start timing decision part 24.

The print mechanism controller 25 includes the maximum document page number decision part 26 that decides the number of the media 61 that can be simultaneously carried on the medium carrying paths of the print mechanism 12, based on a print condition. When a print start instruction is notified from the print controller 22, the print mechanism controller 25 controls the print mechanism 12 to print the image on a medium 61.

Next, a configuration of the reading mechanism 11 is explained in detail.

Figure 3:
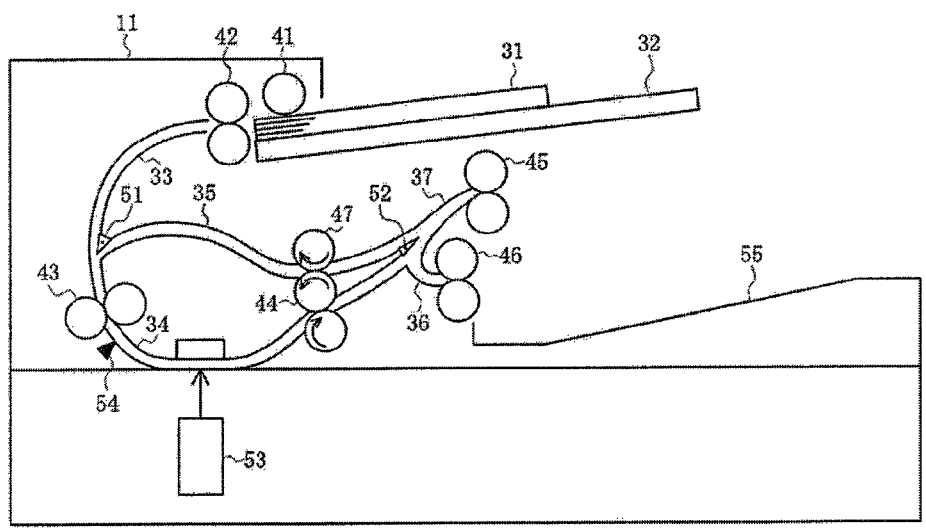
FIG. 3 is a schematic side cross-sectional view illustrating a reading mechanism according to the first embodiment.

FIG. 3 is a schematic side cross-sectional view illustrating a reading mechanism according to the first embodiment.

In the present embodiment, the reading mechanism 11 includes a document table 32 on which a document 31 is placed, document carrying paths 33, 34, 35, 36 and 37 through which the document 31 is carried, a document supply roller 41 that supplies and feeds the document 31 on a document table 32 to the document carrying path 33, document carrying rollers 42, 43, 44, 45, 46 and 47 that carry the document 31, a document separator 51 that switches between the document carrying paths 34 and 35, a document separator 52 that switches between the document carrying paths 36 and 37, a document reading part 53 that includes an image sensor or the like and that reads an image of the document 31 on the document carrying path 34, a reading sensor 54 that monitors timing for starting and ending the reading of the image by the document reading part 53, and a document ejection stacker 55 to which the document 31 from which the image has been read is ejected.

Next, a configuration of the print mechanism 12 is explained in detail.

Figure 4:
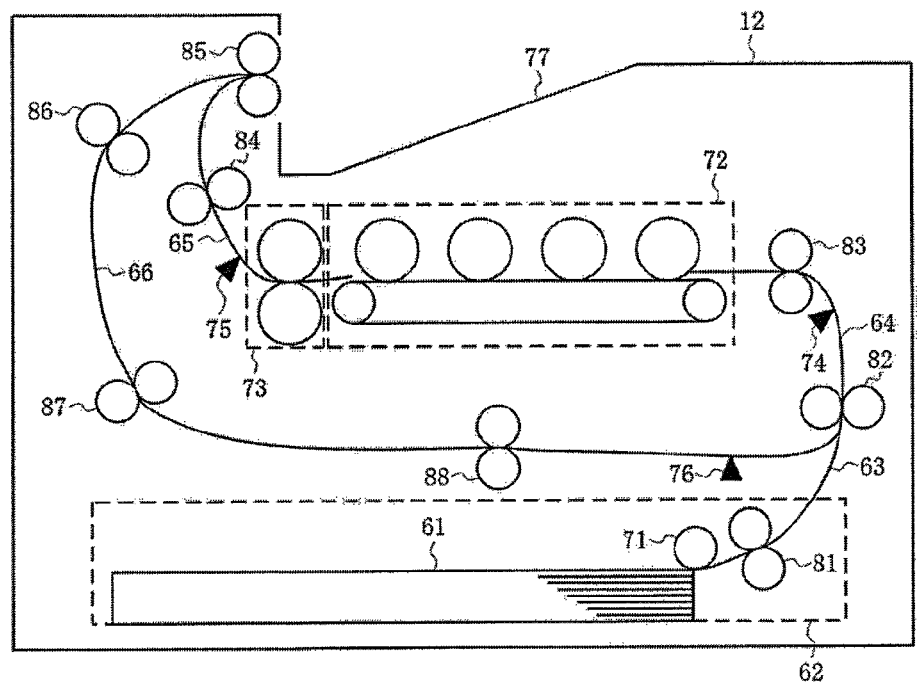
FIG. 4 is a schematic side cross-sectional view illustrating a printing mechanism according to the first embodiment of the present application.

FIG. 4 is a schematic side cross-sectional view illustrating a printing mechanism according to the first embodiment of the present application In the present embodiment, the print mechanism 12 includes a cassette 62 that is set while the media 61, such as a print paper and the like, are stacked therein, medium carrying paths 63, 64, 65 and 66 through which the medium 61 is carried, a medium supply roller 71 that supplies the medium 61 in the cassette 62 and feeds the medium 61 to the medium carrying path 63, medium carrying rollers 81, 82, 83, 84, 85, 86, 87 and 88 that carry the medium 61, an image forming part 72 that forms an image on the medium 61, a fuser 73 that fixes by heat the image formed on the medium 61 by the image forming part 72, medium monitoring sensors 74, 75 and 76 that monitor the carrying of the medium 61, and a medium ejection stacker 77 to which the medium 61 is ejected on which the image has been formed, that is, to which the printing is performed. When the double sided printing is performed, the print mechanism 12 inverts the front and back sides of the medium 61 after performing the printing on one side of the medium 61 and then performs the printing on the other side of the medium 61.

In the print mechanism 12 of the present embodiment, because only the medium monitoring sensor 76 detects passage of the inverted medium 61 when the double sided printing is performed, the number of the media 61 that can be carried on the medium carrying paths 63, 64, 65 and 66 at the same time is limited to two.

Next, operation of the image forming apparatus 10 with the above-described configuration is explained.

First, a double sided reading operation is explained, which is an operation performed by the reading mechanism 11 for reading images of the front and back sides of the original 31.

When there is a request for reading both sides of the medium 61, the reading mechanism controller 15 sets the document separator 51 to be directed downwardly and sets the document separator 52 to be directed upwardly for reading an image on the front side of the document 31, so that the document 31 on the document table 32 is carried through the document carrying paths 33, 34 and 37. Then, the reading mechanism controller 15 drives the document supply roller 41 and the document carrying rollers 42, 43, 44 and 45 to carry the document 31 through the document carrying paths 33, 34 and 37.

At that time, to prevent the next document 31 placed on the document table 32 from being supplied, the document supply roller 41 is stopped after the front end of the document 31 reaches the reading sensor 54 and after a predetermined time elapses. In addition, after the time for the front end of the document 31 to pass the reading sensor 54 and to reach the document reading part 53 has elapsed, the document reading part 53 starts reading the image on the front side of the document 31. Then, after the time for the rear end of the document 31 to pass the reading sensor 54 and to reach the document reading part 53 elapses, the document reading part 53 ends the reading of the image on the front side of the document 31.

Next, to read the image on the back side of the document 31, after the rear end of the document 31 passes the reading sensor 54 and when the rear end of the document 31 is carried immediately before passing the document carrying roller 45, the document carrying rollers 42, 43, 44 and 45 are stopped. Thereafter, to read the image on the back side of the document 31, the document separator 52 is set to be directed downwardly and the document separator 51 is set to be directed upwardly after the document 31 passes through the document carrying path 35, so that the document 31 is carried through the document carrying path 34.

Then, by driving the document carrying rollers 42, 43, 44 and 45, the document 31 is carried from the document carrying path 37 and through the document carrying path 35 so as to pass through the document carrying path 34.

At that time, after the time for the front end of the document 31 to pass the reading sensor 54 and to reach the document reading part 53 has elapsed, the document reading part 53 starts reading the image on the back side of the document 31. Then, after the time for the rear end of the document 31 to pass the reading sensor 54 and to reach the document reading part 53 elapses, the document reading part 53 ends the reading of the image on the back side of the document 31.

In addition, for preparation for an inversion operation for the document 31 to match the order of documents outputted to the document ejection stacker 55, the rotation of the document carrying roller 45 is reversed, and the document separator 52 is set to be directed upwardly when the front end of the document 31 reaches the reading sensor 54 so that the document 31 moves on the document carrying path 37. Thereafter, as the inversion operation for the document 31, after the rear end of the document 31 passes the reading sensor 54 and when the rear end of the document 31 is carried immediately before passing the document carrying roller 45, the document carrying rollers 43, 44, 45 and 47 are stopped.

Next, by setting the document separators 51 and 52 to be directed upwardly and downwardly, respectively, and by driving the document carrying rollers 43, 44, 45, 46 and 47 so that the document 31 is carried to the document carrying paths 35 and 36, the document 31 is carried to pass through the document carrying paths 37, 35, 34 and 36. At that time, after the time for the rear end of the document 31 to pass the reading sensor 54 and for the document 31 to be ejected to the document ejection stacker 55 has elapsed, the document carrying rollers 42, 43, 44, 45, 46 and 47 are stopped.

Thereafter, the above operation is repeated until there is no document 31 on the document table 32.

Next, a double sided print operation, which is the operation by the print mechanism 12 to form an image on the front and back sides of the medium 61, is explained.

Figure 5:
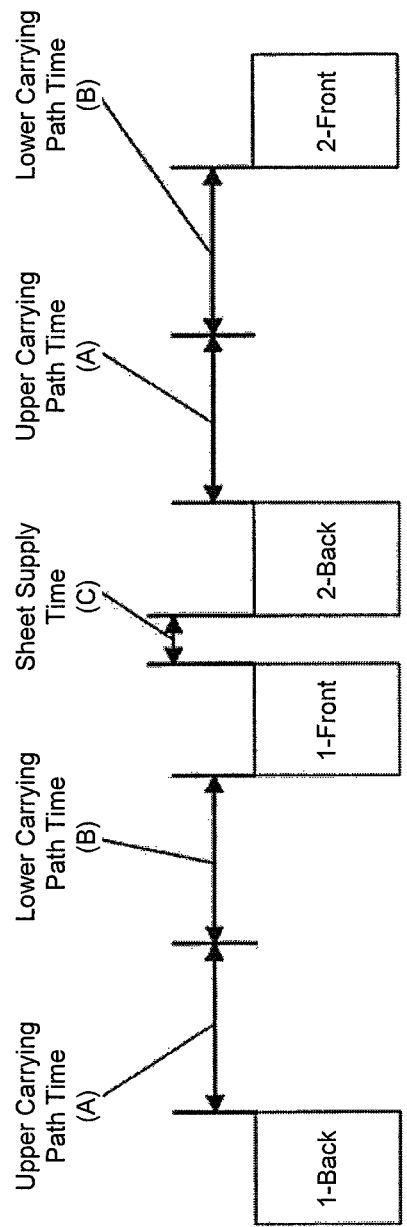
FIG. 5 is a diagram illustrating a sequence of a medium carrying state in a first double sided print operation according to the first embodiment of the present application.

FIG. 5 is a diagram illustrating a sequence of a medium carrying state in a first double sided print operation according to the first embodiment of the present application.

Figure 6:
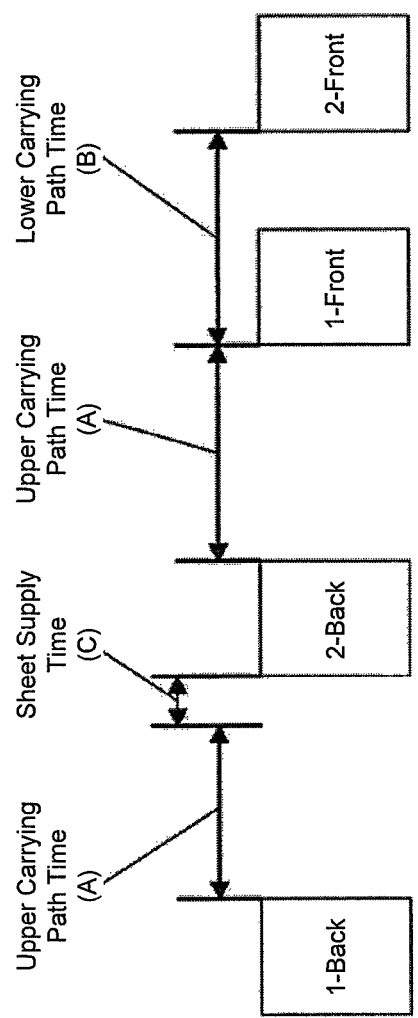
FIG. 6 is a diagram illustrating a sequence of a medium carrying state in a second double sided print operation according to the first embodiment of the present application.

FIG. 6 is a diagram illustrating a sequence of a medium carrying state in a second double sided print operation according to the first embodiment of the present application.

When a double sided print request is received, the print mechanism controller 25 drives the medium supply roller 71, the medium carrying rollers 81, 82, 83, 84 and 85, the image forming part 72 and the fuser 73 to supply the first medium 61 from the cassette 62 and to carry the medium 61 to pass through the medium carrying paths 63, 64 and 65.

At that time, with the timing for the front end of the first medium 61 to pass through the medium monitoring sensor 74 as a trigger, an image of the back surface is transferred to the first medium 61 by the image forming apparatus 72. Then, the transferred image is fixed to the first medium 61 by heat and pressure using the fuser 73. As a result, the printing of an image on the back side of the first medium 61 is completed.

After that, when the first medium 61 is carried, and when the rear end of the first medium 61 passes through the medium monitoring sensor 75 and reaches a point immediately before passing through the medium carrying roller 85, the medium carrying roller 85 is stopped to temporarily stop the medium 61.

At that time, a first double sided print operation as a first double sided print mode, or a second double sided print operation as a second double sided print mode is performed depending on whether or not page data for the front and back side to be printed on the second medium 61 is ready. As the first double sided print operation and the second double sided print operation differ from each other, each operation is separately explained. In the second double sided print operation, the interval between the mediums 61 is set shorter than that in the first double sided print operation.

First, in the first double sided print operation, which is a double sided print operation performed when the page data from the front side and back side to be printed on the second medium 61 is not ready, the medium carrying rollers 85, 86, 87 and 88 are driven to invert the first medium 61. After the first medium 61 is moved to the medium carrying path 66, the image for the front side is printed on the first medium 61 by the image forming part 72 and the fuser 73. At that time, when the rear end of the first medium 61 passes through the medium monitoring sensor 76, the medium carrying rollers 85, 86, 87 and 88 are stopped.

If the page data to be printed on the second medium 61 is ready when the rear end of the first medium 61 passes through the medium monitoring sensor 74, the second medium 61 is supplied by the medium supply roller 71, and the operation similar to the printing on the first medium 61 is repeated.

On the other hand, if the page data to be printed on the second medium 61 is not ready when the rear end of the first medium 61 passes through the medium monitoring sensor 74, the medium carrying rollers 81, 82, 83, 84 and 85, the image forming part 72 and the fuser 73 are stopped after the time for the rear end of the first medium 61 to pass through the medium monitoring sensor 75 and for the first medium 61 to be ejected to the medium ejection stacker 77 has elapsed.

FIG. 5 shows a sequence of the carrying status of the medium when the double sided printing is performed on two media 61 in the first double sided print operation. The interval between the media 61, that is, the total sheet distance, is expressed by the following Equation (1).

Total Sheet Distance=Upper Carrying Path Time($A$)×2+Lower Carrying Path Time($B$)×2+Sheet Supply Time($C$)    Equation (1)

Here, the upper carrying path time (A) is a time during which the medium 61 is carried from the position of the medium monitoring sensor 74 and the position to invert the medium 61. The lower carrying path time (B) is a time during which the medium 61 is carried from the position where the medium temporarily stopped to the position of the medium monitoring sensor 74. The sheet supply time (C) is a time during which the medium 61 is supplied from the medium supply roller 71 to the position of the medium monitoring sensor 74.

Next, in the second double sided print operation, which is a double sided print operation performed when the page data for the front side and the back side to be printed on the second medium 61 is ready, the second medium 61 is supplied by the medium supply roller 71. Then, when the front end of the second medium 61 passes through the medium monitoring sensor 74, the medium carrying rollers 85, 86, 87 and 88 are driven to invert the first medium 61. After that, when the front end of the first medium 61 reaches the position of the medium monitoring sensor 76, the medium carrying rollers 86, 87 and 88 are stopped.

At that time, an image of the back side is printed on the second medium 61 by the image forming part 72 and the fuser 73. After that, when the rear end of the second medium 61 passes through the medium monitoring sensor 75 and is carried by a certain distance, the medium carrying roller 85 is stopped, and thereby the carrying of the second medium 61 is stopped.

Next, the first medium is carried by driving the medium carrying rollers 85, 86, 87 and 88 such that the first medium 61 passes through the medium carrying paths 64 and 65. Therefore, an image of the front side is printed on the first medium 61 by the image forming part 72 and the fuser 73.

In addition, when the front end of the second medium 61 reaches the medium monitoring sensor 76, the medium carrying rollers 85, 86, 87 and 88 are stopped, and thereby the carrying of the second medium 61 is stopped.

At that time, if the page data for the front side and back side to be printed on the third medium 61 is ready, the third medium 61 is supplied by the medium supply roller 71, and the operation similar to printing the second medium 61 is repeated.

On the other hand, if the page data for the front side and the back side to be printed on the third medium 61 is not ready, the second medium is carried by driving the medium carrying rollers 81, 82, 84 and 85 such that the second medium 61 passes through the medium carrying paths 64 and 65. Therefore, an image of the front side is printed on the second medium 61 by the image forming part 72 and the fuser 73.

In addition, when the rear end of the second medium 61 passes through the medium monitoring sensor 76, the medium carrying rollers 85, 86, 87 and 88 are stopped. After that, after the time for the rear end of the second medium 61 to pass through the medium monitoring sensor 75 and for the second medium 61 to be ejected to the medium ejection stacker 77 has elapsed, the medium carrying rollers 81, 82, 83, 84 and 85, the image forming apparatus 72 and the fuser 73 are stopped.

FIG. 6 shows a sequence of the carrying status of the medium when the double sided printing is performed on two media 61 in the second double sided print operation. The interval between the media 61, that is, the total sheet distance, is expressed by the following Equation (2).

Total Sheet Distance=Upper Carrying Path Time($A$)×2+Lower Carrying Path Time($B$)+Sheet Supply Time($C$)    Equation (2).

Next, an operation of a copy process by the above-described image forming apparatus 10 is explained.

Figure 7:
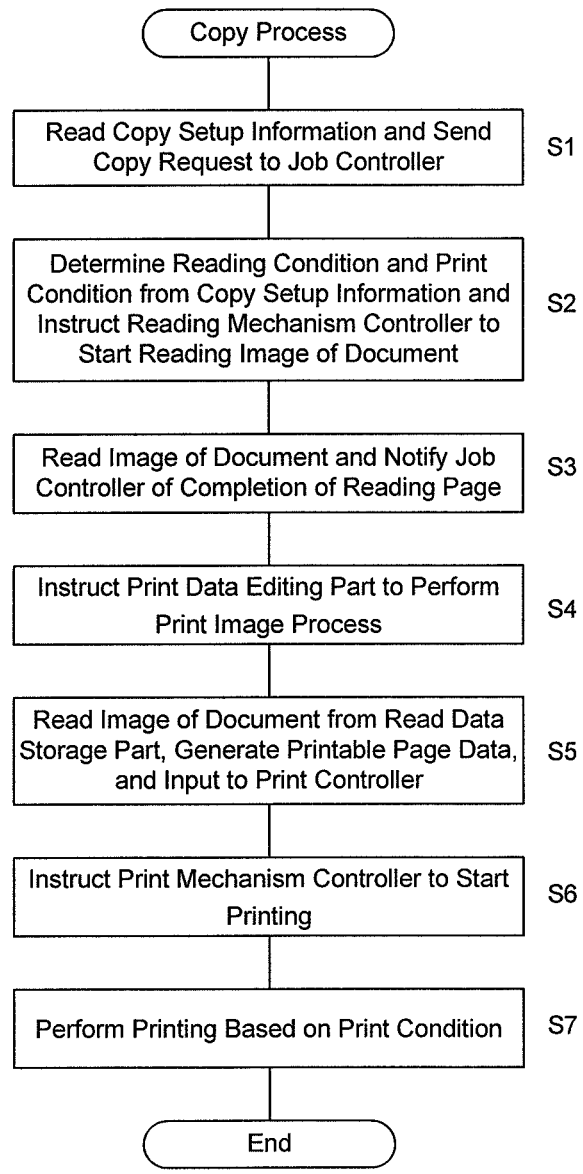
FIG. 7 is a flow diagram illustrating an operation of a copy process according to the first embodiment of the present application.

FIG. 7 is a flow diagram illustrating an operation of a copy process according to the first embodiment of the present application.

First, when the user of the image forming apparatus 10 presses down a Copy Start button, which is one of the switches 13c on an operation panel 13b, the display part 13 recognizes the depression of the copy start button, reads copy setup information set by the user, and instructs the job controller 14 to start copying based on the copy setup information. That is, a copy request is made to the job controller 14 (S1).

Then, the job controller 14 that has received the copy start instruction from the display part 13 determines a reading condition and a print condition from the received copy setup information and instructs the reading mechanism controller 15 to start reading an image of the document 31 (S2).

Next, the reading mechanism controller 15 that has received a reading start instruction from the job controller 14 reads an image of the document 31 by controlling the reading mechanism 11 and stores the read image in the read data storage part 16. Then, when the reading of the image of 1 page of the document 31 is completed, the reading mechanism controller 15 notifies the job controller 14 of the completion of reading the page (S3). The reading mechanism controller 15 repeats the operation of S3 until the reading of the image of the last page of the document 31 is completed.

Moreover, the job controller 14 that has received a notice from the reading mechanism controller 15 of the completion of reading the page instructs the print data editing part 17 to perform the print image process based on the print condition determined at S2 (S4).

Next, the print data editing part 17 that has received the print image process instruction from the job controller 14 determines information necessary for the print image process from the received print condition, reads the image of the document 31 from the read data storage part 16 and generates printable page data. Then, the print data editing part 17 stores the page data in the page data storage part 21 and inputs the page data to the print controller 22 (S5). Further, the print data editing part 17 sends a page data generation notice to the print controller 22.

Next, the print controller 22 to which the page data has been inputted from the print data editing part 17 sends a print request to the print mechanism controller 25 based on the print condition and the number of pages of the inputted page data to instruct to start printing (S6).

Then, the print mechanism controller 25 that has received the print request from the print controller 22 controls the print mechanism 12 and prints the page data based on the print condition, such as the medium 61 to be printed, a single sided print instruction, a double sided print instruction, and the like (S7).

Next, operation of the print page generation monitoring part 23 is explained.

Figure 8:
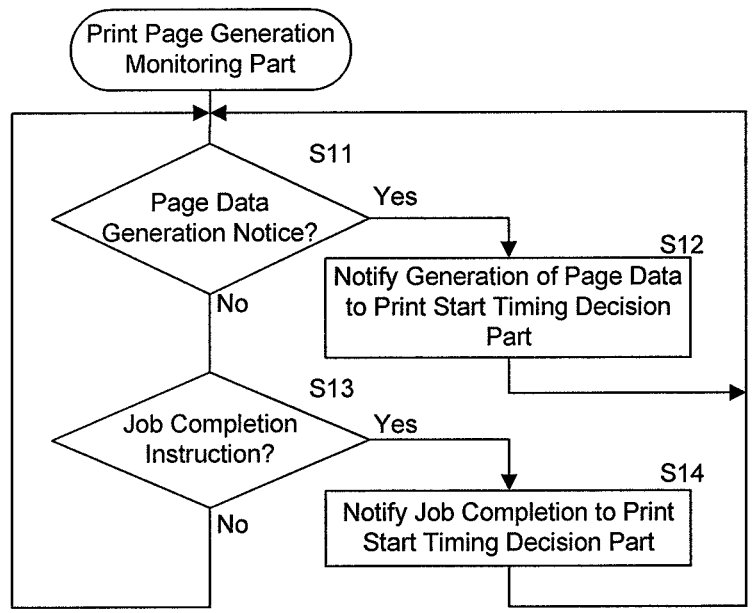
FIG. 8 is a flow diagram illustrating an operation of a print page generation monitoring part according to the first embodiment of the present application.

FIG. 8 is a flow diagram illustrating an operation of a print page generation monitoring part according to the first embodiment of the present application.

First, the print page generation monitoring part 23 determines whether or not there is a page data generation notice from the print data editing part 17 (S11).

If there is a page data generation notice, the process moves to S12. The print page generation monitoring part 23 notifies the print start timing decision part 24 of the generation of page data (S12), and the process returns to S11.

If there is no page data generation notice upon the determination as to whether or not there is a page data generation notice, the process moves to S13. The print page generation monitoring part 23 determines whether or not there is a job completion instruction from the job controller 14 (S13).

If there is a job completion instruction, the print page generation monitoring part 23 notifies the print start timing decision part 24 of the job completion (S14), and the process returns to S11.

If there is no job completion instruction upon the determination as to whether or not there is a job completion instruction, the print page generation monitoring part 23 remains as is, and the process returns to S11.

Next, operation of the print start timing decision part 24 is explained. The print start timing decision part 24 decides the print start timing after the number of the media 61 decided by the maximum document page number decision part 26 becomes equal to the page data number monitored by the print page generation monitoring part 23.

Figure 9:
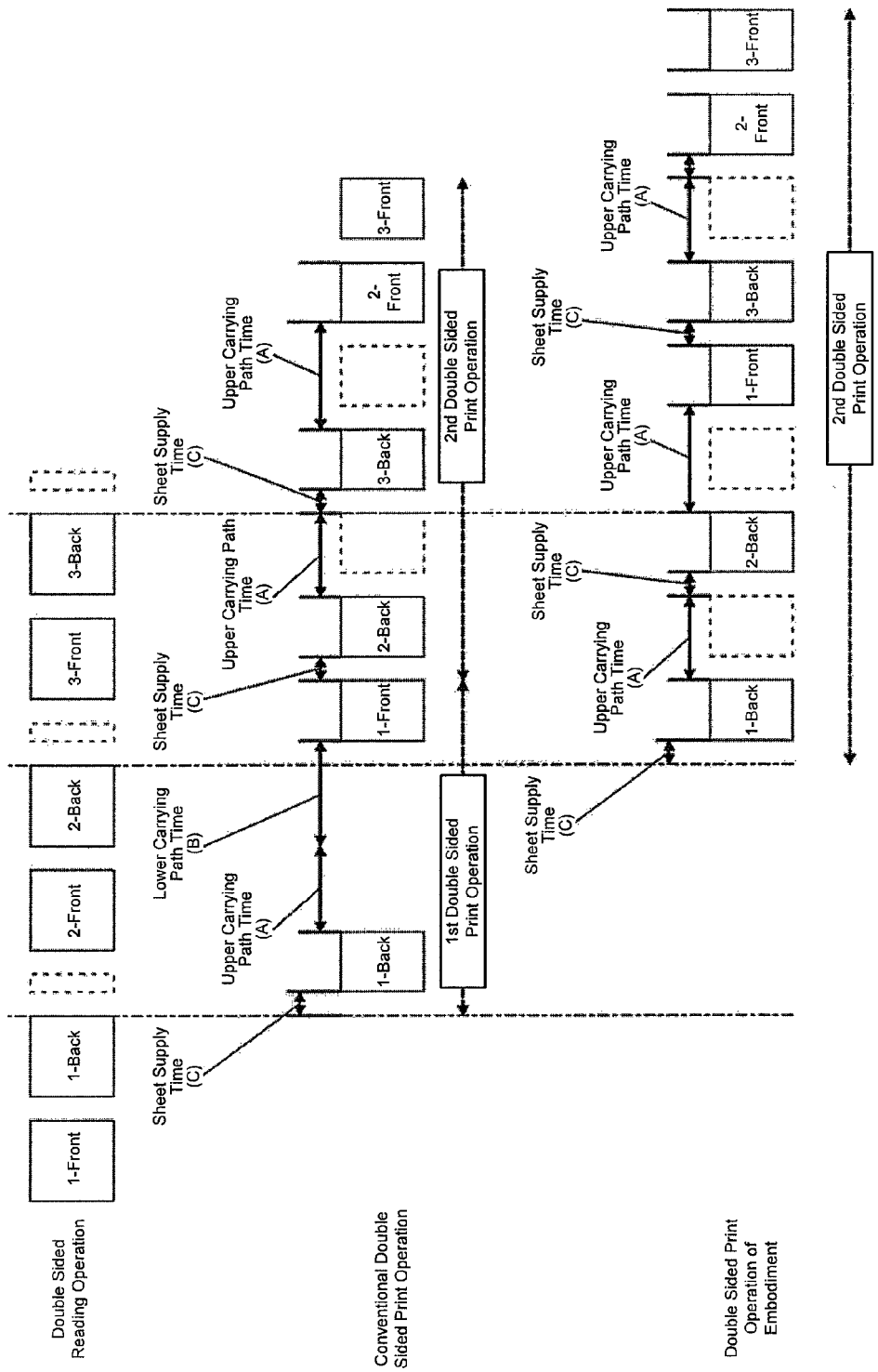
FIG. 9 is an explanatory diagram comparing the medium carrying state in the double sided print operation according to the first embodiment of the present application with the conventional double sided print operation.
Figure 10:
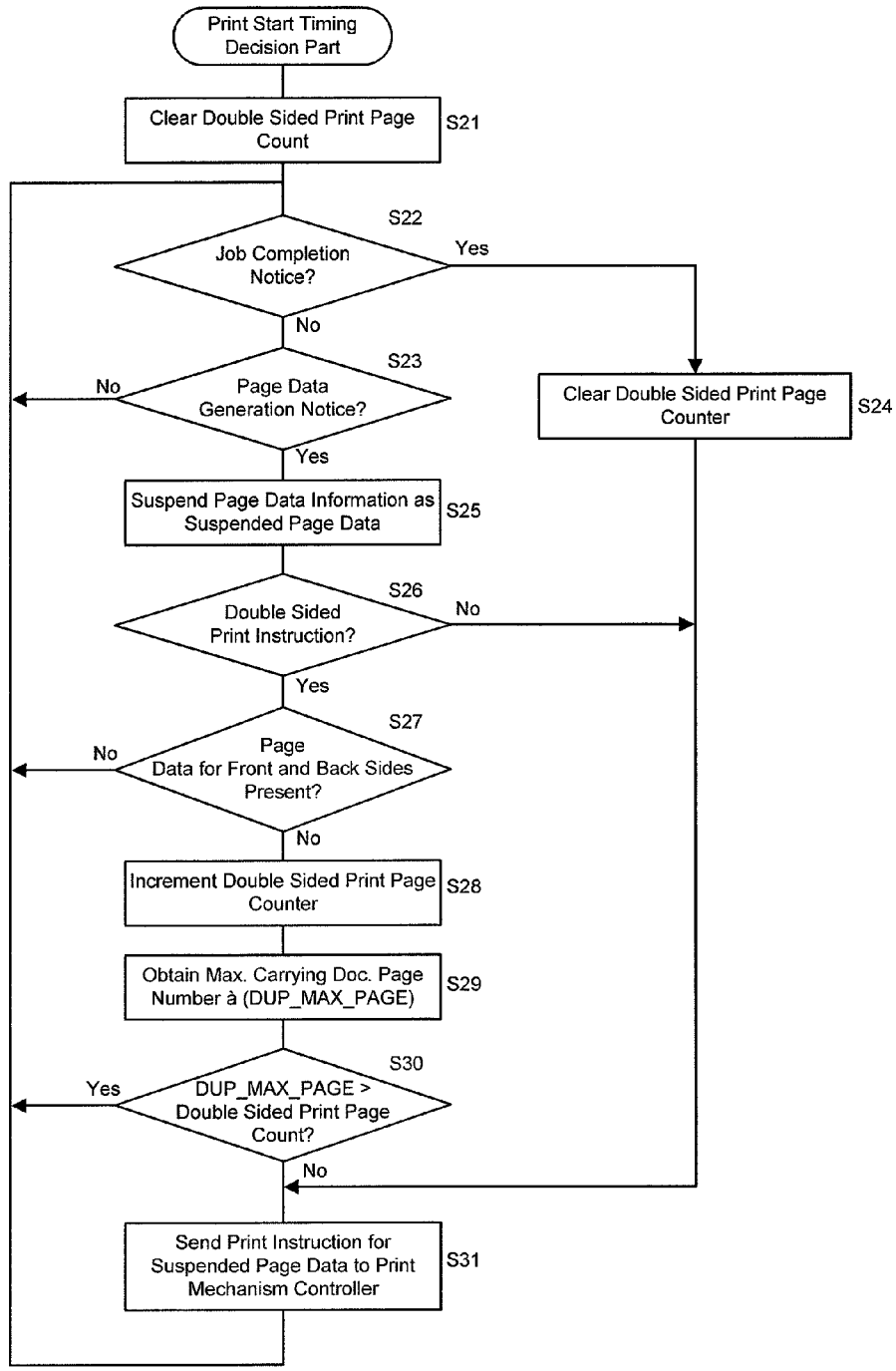
FIG. 10 is a flow diagram illustrating an operation of a print start timing decision part according to the first embodiment of the present application.

FIG. 9 is an explanatory diagram comparing the medium carrying state in the double sided print operation according to the first embodiment of the present application with the conventional double sided print operation. FIG. 10 is a flow diagram illustrating an operation of a print start timing decision part according to the first embodiment of the present application.

First, the print start timing decision part 24 clears a double sided print page count for initialization (S21).

Next, the print start timing decision part 24 determines whether or not there is a job completion notice from the print page generation monitoring part 23 (S22).

Then, if there is a job completion notice, the process moves to S24. The print start timing decision part 24 clears the double sided print page count (S24), requests the print mechanism controller 25 to print the suspended page data and clears information of the suspended page data. That is, the print start timing decision part 24 sends a print instruction for the suspended page to the print mechanism controller 25 (S31). Then, the print start timing decision part 24 returns to S22.

If there is no job completion notice upon the determination as to whether or not there is a job completion notice, the process moves to S23. The print start timing decision part 24 determines whether or not there is a page data generation notice from the print page generation monitoring part 23 (S23).

Then, if there is no page data generation notice, the print start timing decision part 24 returns to S22.

If there is a page data generation notice upon the determination as to whether or not there is a page data generation notice, the process moves to S25. The print start timing decision part 24 registers the information of the page data, generation of which is notified, as the suspended page data (S25).

Next, the print start timing decision part 24 refers to the print condition and determines whether or not the print condition is a double sided print instruction (S26).

Then, if the print condition is not a double sided print instruction, that is, if the print condition is a single sided print instruction, the print start timing decision part 24 checks whether or not there is suspended page data. If there is suspended page data, the print start timing decision part 24 requests the print mechanism controller 25 to print the suspended page data and clears information of the suspended page data. That is, the print start timing decision part 24 sends a print instruction for the suspended page to the print mechanism controller 25 (S31) and returns to S22.

If the print condition is the double sided print instruction upon the determination as to whether the print condition is a double sided print instruction, the process moves to S27. The print start timing decision part 24 determines whether or not all of the page data for the front side and the back side is present, that is, whether or not the front and back pages are present (S27).

Then, if the page data for the front side and the back side is not present, the print start timing decision part 24 returns as is to S22.

If the page data for the front side and the back side is present upon the determination as to whether or not the page data for the front side and the back side is present, the process moves to S28. The print start timing decision part 24 increments the double sided print page count (S28).

Next, the print start timing decision part 24 obtains the maximum carrying document page number (DUP_MAX_PAGE) from the maximum document page number decision part 26 (S29). The maximum document page number decision part 26 uses the following Equation (3) to determine the maximum carrying document page number. When the condition of Equation (3) is met, the maximum carrying document page number is set to 2. If the condition of Equation (3) is not met, the maximum carrying document page number is set to 1.

Size of Document To Be Printed<Distance from Medium Carrying Roller 85 to Medium Monitoring Sensor 76, or Distance on Medium Carrying Path 66  Equation (3)

Next, the print start timing decision part 24 compares the obtained maximum carrying document page number and the double sided print page count and determines whether or not the double sided print page count is smaller than the maximum carrying document page number (S30).

Then, if the double sided print page count is not smaller than the maximum carrying document page number, that is, when the double sided print page count is equal to or more than the maximum carrying document page number, the process moves to S31. The print start timing decision part 24 checks whether or not there is suspended page data. If there is suspended page data, the print start timing decision part 24 requests the print mechanism controller 25 to print the suspended page data and clears the information of the suspended page data. That is, the print start timing decision part 24 sends a print instruction for the suspended page data to the print mechanism controller 25 (S31) and returns to S22.

If the double sided print page count is smaller than the maximum carrying document page number upon the determination as to whether the double sided print page count is smaller than the maximum carrying document page number, the print start timing decision part 24 returns as is to S22.

FIG. 9 shows a sequence of the carrying state of the document 31 for double sided reading and the carrying state of the medium 61 under the double sided print operation according to the present embodiment, together with the carrying state of the medium 61 under the conventional double sided print operation. In the conventional carrying of medium, the first double sided print operation and the second double sided print operation are performed. In contrast, the carrying of the medium according to the present embodiment, only the second double sided print operation is performed. It is understood from FIG. 9 that, in the carrying of medium according to the present embodiment, the sheet distance can be shortened by the lower carrying path time (B), compared with the conventional carrying of medium.

As discussed above, according to the present embodiment, free running of the image forming part 72 is prevented when double sided printing is performed. Therefore, the power consumption is suppressed, and the life of consumables and the device is extended.

Next, a second embodiment of the present application is explained. Explanation of the parts that have the same structure as the first embodiment is omitted by assigning the same reference numerals. In addition, explanation of the same operation and effects as the first embodiment is also omitted.

Figure 11:
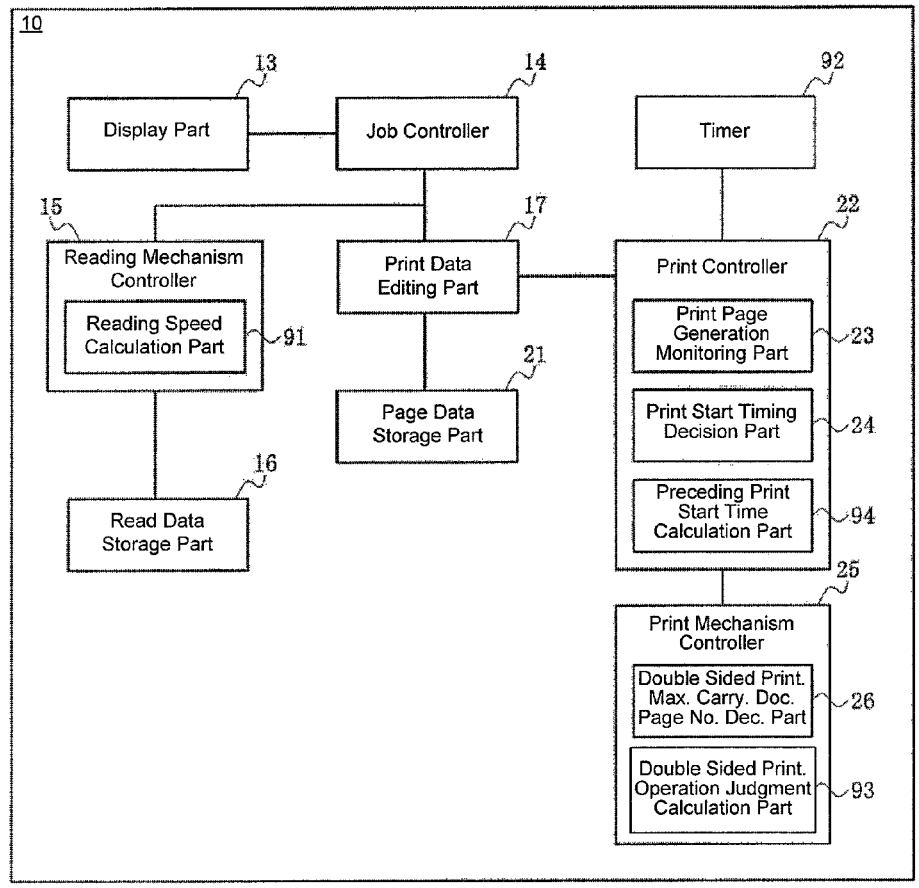
FIG. 11 is a block diagram illustrating a configuration of a control system of the image forming apparatus according to a second embodiment of the present application.

FIG. 11 is a block diagram illustrating a configuration of a control system of the image forming apparatus according to the second embodiment of the present application.

As shown in the figure, the image forming apparatus 10 according to the present embodiment includes a timer 92. In addition, the reading mechanism controller 15 includes a reading speed calculation part 91 that calculates a reading speed and reading time of the document by the reading mechanism 11. Moreover, the print mechanism controller 25 includes a double sided print operation judgment time calculation part 93 (maybe referred to as "judgement time calculation part") that calculates time to start the next page at the time of double sided printing. The double sided print operation judgment time calculation part 93 calculates time from the start of the double side printing to the judgment as to whether the double sided printing is performed under the first double sided print mode, that is, the first double sided print operation, or the second double sided print mode, that is, the second double sided print operation. Furthermore, the print controller 22 includes a preceding print start time calculation part 94 that calculates a timing to start the double sided printing, that is, time to start printing, based on the reading time calculated by the reading speed calculation part 91 and the time calculated by the double sided print operation judgment calculation part 93.

Configurations of other parts of the image forming apparatus 10 according to the present embodiment are the same as the first embodiment. Therefore, explanation is omitted.

Next, operation of the image forming apparatus 10 according to the present embodiment is explained. Here, operations of the print start timing decision part 24 and the preceding print start time calculation part 94 are explained. Explanation of other operations is omitted as they are the same as the first embodiment. First, an operation of the print start timing decision part 24 is explained.

Figure 12:
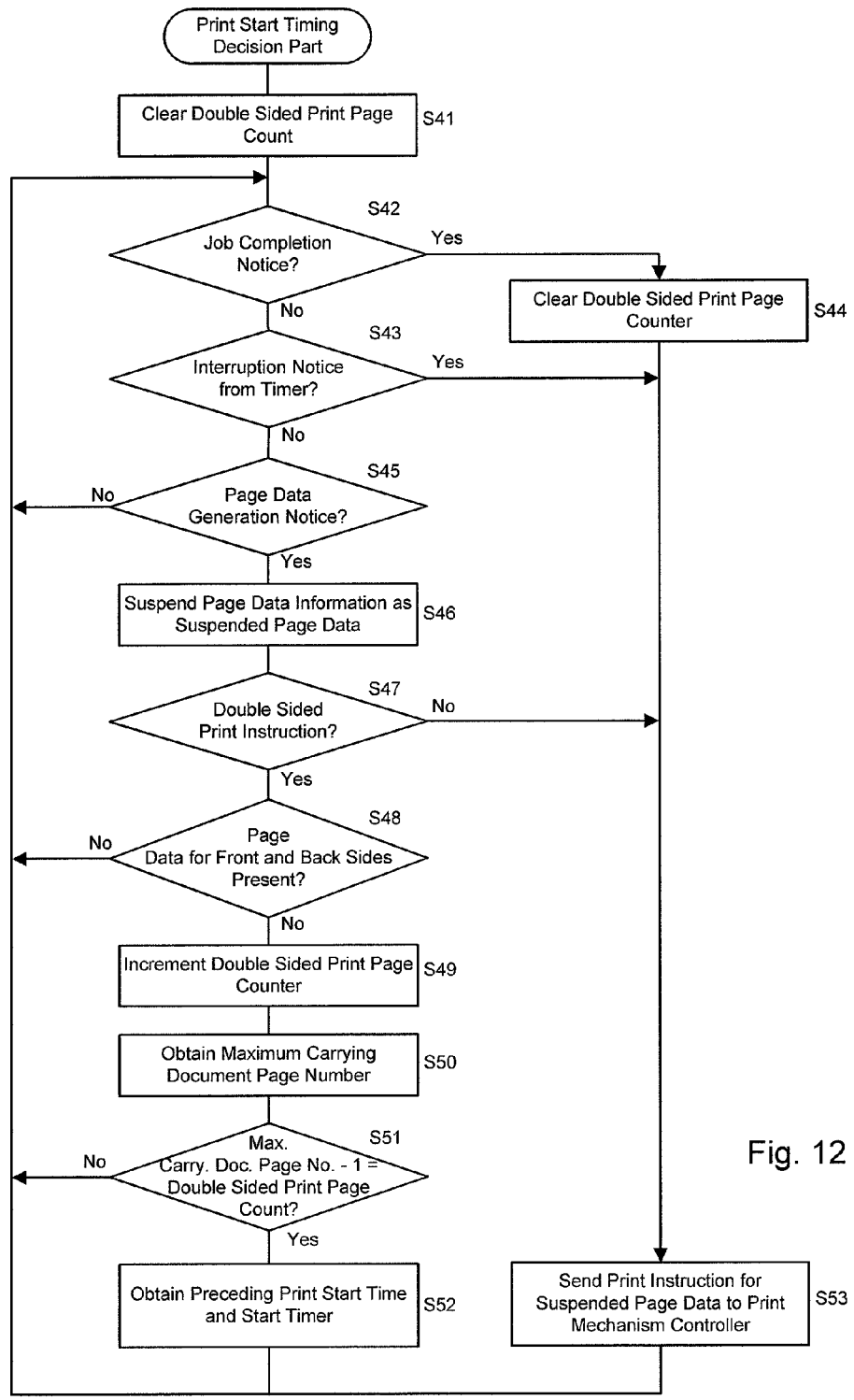
FIG. 12 is a flow diagram illustrating an operation of a print start timing decision part according to the second embodiment of the present application.

FIG. 12 is a flow diagram illustrating an operation of the print start timing decision part according to the second embodiment of the present application.

First, the print start timing decision part 24 clears a double sided print page count for initialization (S41).

Next, the print start timing decision part 24 determines whether or not there is a job completion notice from the print page generation monitoring part 23 (S42).

Then, if there is a job completion notice, the process moves to S44. The print start timing decision part 24 clears the double sided print page count (S44), requests the print mechanism controller 25 to print the suspended page data and clears information of the suspended page data. That is, the print start timing decision part 24 sends a print instruction for the suspended page to the print mechanism controller 25 (S53). Then, the print start timing decision part 24 returns to S42.

If there is no job completion notice upon the determination as to whether or not there is a job completion notice, the process moves to S43. The print start timing decision part 24 determines whether or not there is an interruption notice from the timer 92 (S43).

Then, if there is an interruption notice from the timer 92, the print start timing decision part 24 requests the print mechanism controller 25 to print the suspended page data and clears information of the suspended page data. That is, the print start timing decision part 24 sends a print instruction for the suspended page to the print mechanism controller 25 (S53). Then, the print start timing decision part 24 returns to S42.

If there is no interruption notice from the timer 92 upon the determination as to whether or not there is an interruption notice from the timer 92, the process moves to S45. The print start timing decision part 24 determines whether or not there is a page data generation notice from the print page generation monitoring part 23 (S45).

Then, if there is no page data generation notice, the print start timing decision part 24 returns to S42.

If there is a page data generation notice upon the determination as to whether or not there is a page data generation notice, the process moves to S46. The print start timing decision part 24 registers the information of the page data, generation of which is notified, as the suspended page data (S46).

Next, the print start timing decision part 24 refers to the print condition and determines whether or not the print condition is a double sided print instruction (S47).

Then, if the print condition is not a double sided print instruction, that is, if the print condition is a single sided print instruction, the process moves to S53. The print start timing decision part 24 checks whether or not there is suspended page data. If there is suspended page data, the print start timing decision part 24 requests the print mechanism controller 25 to print the suspended page data and clears information of the suspended page data. That is, the print start timing decision part 24 sends a print instruction for the suspended page data to the print mechanism controller 25 (S53) and returns to S42.

If the print condition is the double sided print instruction upon the determination as to whether the print condition is a double sided print instruction, the process moves to S48. The print start timing decision part 24 determines whether or not all of the page data for the front side and the back side is present, that is, whether or not the front and back pages are present (S48).

Then, if the page data for the front side and the back side is not present, the print start timing decision part 24 returns as is to S42.

If the page data for the front side and the back side is present upon the determination as to whether or not the page data for the front side and the back side is present, the process moves to S49. The print start timing decision part 24 increments the double sided print page count (S49).

Next, the print start timing decision part 24 obtains the maximum carrying document page number from the maximum document page number decision part 26 (S50).

Next, the print start timing decision part 24 compares the number of the obtained maximum carrying document page number subtracted by 1 and the double sided print page count and determines whether or not the double sided print page count is smaller than the number of the maximum carrying document page number subtracted by 1 (S51).

If the double sided print page count is equal to the number of the maximum carrying document page number subtracted by 1, the process moves to S52. The print start timing decision part 24 obtains the preceding print start time, that is, the time from the current time to the time to start printing, from the preceding print start time calculation part 94, starts the timer 92 based on the obtained time (S52), and returns to S42.

If the double sided print page count is not equal to the number of the maximum carrying document page number subtracted by 1, the print start timing decision part 24 returns to S42.

Next, an operation of the preceding print start time calculation part 94 is explained.

Figure 13:
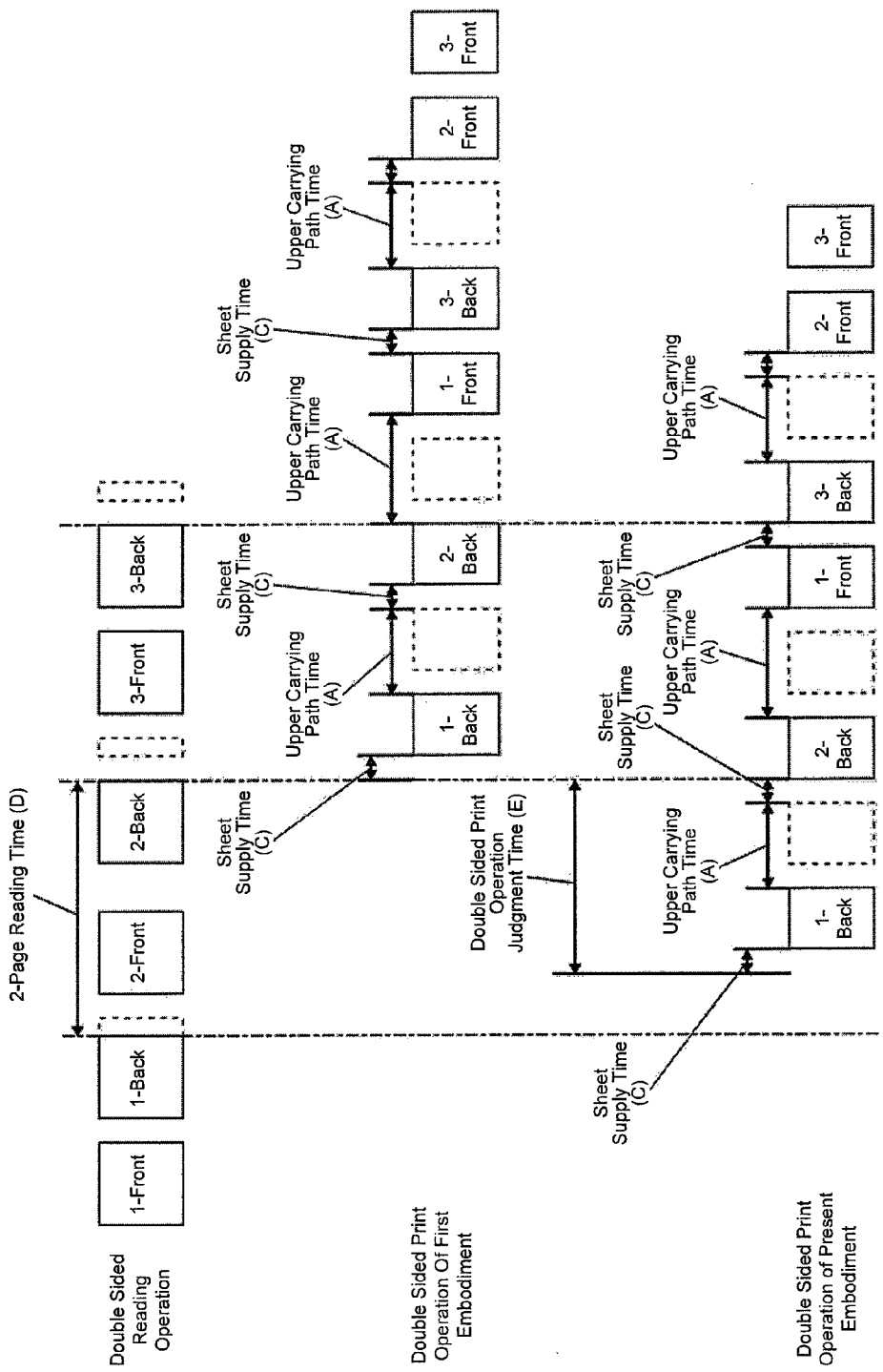
FIG. 13 is an explanatory diagram comparing the medium carrying state in the double sided print operation according to the second embodiment of the present application with the double sided print operation according to the first embodiment.
Figure 14:
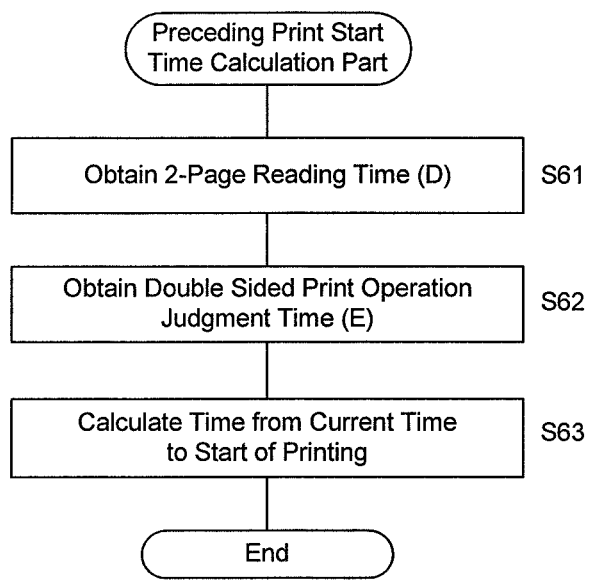
FIG. 14 is a flow diagram illustrating an operation of a preceding print start time calculation part according to the second embodiment of the present application.

FIG. 13 is an explanatory diagram comparing the medium carrying state in the double sided print operation according to the second embodiment of the present application with the double sided print operation according to the first embodiment. FIG. 14 is a flow diagram illustrating an operation of a preceding print start time calculation part 94 according to the second embodiment of the present application.

First, the preceding print start time calculation part 94 obtains 2-page reading time (D) from the reading speed calculation part 91 (S61).

Next, the preceding print start time calculation part 94 obtains double sided print operation judgment time (E) from the double sided print operation judgment time calculation part 93 (S62).

Lastly, from the 2-page reading time (D) and the double sided print operation judgment time (E), the preceding print start time calculation part 94 calculates time from the current time to the time to start printing based on the following Equation (4) and returns the calculated time to the print start timing decision part 24 (S63).

$$\text{2-Page Reading Time}(D) - \text{Double Sided Print Operation Judgment Time}(E) \quad \text{Equation (4)}$$

The reading speed calculation part 91 calculates the time (D) to read 2 pages of the documents based on a reading condition.

In addition, the double sided print operation judgment time calculation part 93 calculates the double sided print operation judgment time (E) based on the following Equation (5).

$$\text{Sheet Supply Time}(C) \times 2 + \text{Upper Carrying Path Time}(A) + \text{1-Page Medium Carrying Time} \quad \text{Equation (5)}$$

FIG. 13 shows a sequence of the carrying state of the document 31 for double sided reading and the carrying state of the medium 61 under the double sided print operation according to the present embodiment, together with the carrying state of the medium 61 under the double sided print operation according to the first embodiment.

The 2-page reading time (D) is the time from the completion of reading the back side of the first document 31 to the completion of reading the back side of the second document 31. In addition, the second double sided print operation judgment time (E) is the time for the print mechanism controller 25 to receive a print start request and to determine whether or not there is page data for the front side and the back side of the second page.

As described above, according to the present embodiment, the double sided print start time is made earlier by considering the reading speed for the document 31. Therefore, the time to obtain a print result is shortened compared to the first embodiment.

Next, a third embodiment of the present application is explained. Explanation of the parts that have the same structure as the first and second embodiments is omitted by assigning the same reference numerals. In addition, explanation of the same operation and effects as the first and second embodiments is omitted.

Figure 15:
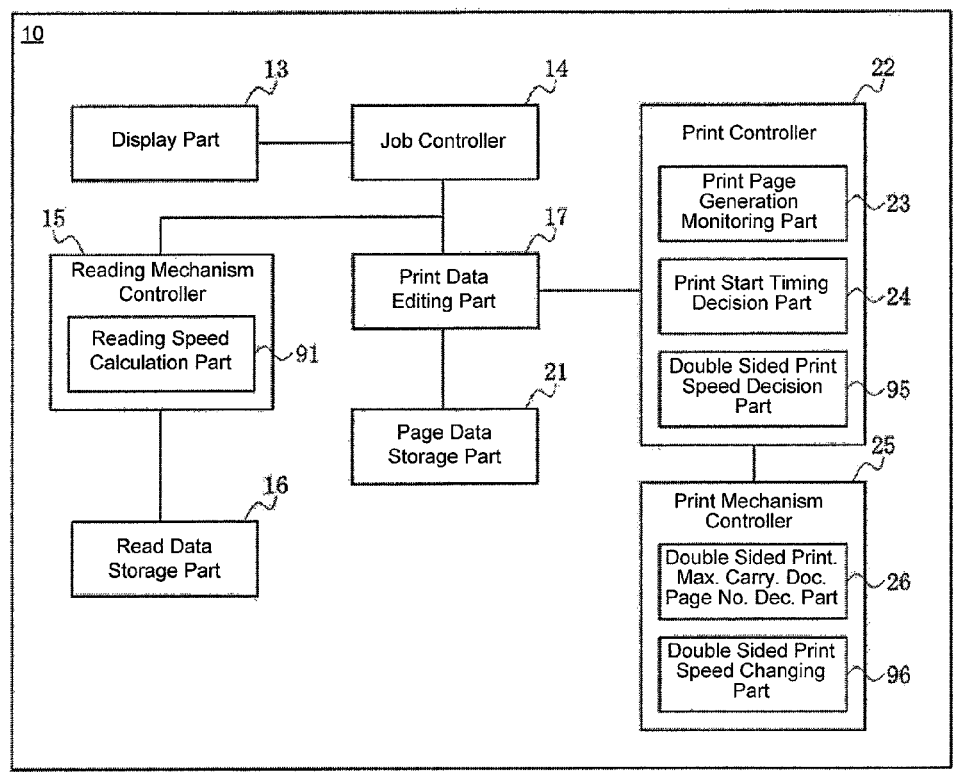
FIG. 15 is a block diagram illustrating a configuration of a control system of the image forming apparatus according to a third embodiment of the present application.

FIG. 15 is a block diagram illustrating a configuration of a control system of the image forming apparatus according to the third embodiment of the present application.

As shown in the figure, the image forming apparatus 10 according to the present embodiment does not include the timer 92. In addition, the print mechanism controller 25 does not include the double sided print operation judgment time calculation part 93 but instead includes a double sided print speed changing part 96 that changes the print speed at the time of double sided printing by the print mechanism 12. The double sided print speed changing part 96 allows to change the print speed at the time of double sided printing at three levels: high speed (30 [PPM]), medium speed (20 [PPM]) and low speed (10 [PPM]). The double sided print speed changing part 96 has a list of supported print speeds at the time of double sided printing (double sided print supported speed information). Moreover, the print controller 22 does not include the preceding print start time calculation part 94 but instead includes a double sided print speed decision part 95 (maybe referred to as "print speed decision part") that decides the print speed at the time of double sided printing in response to the print condition. The double sided print speed decision part 95 decides the double sided print speed from the reading time calculated by the reading speed calculation part 91.

Configurations of other parts of the image forming apparatus 10 according to the present embodiment are the same as the second embodiment. Therefore, explanation is omitted.

Next, an operation of the image forming apparatus 10 according to the present embodiment is explained. Here, operations of the print start timing decision part 24 and the double sided print speed decision part 95 are explained. Explanation of other operations is omitted as they are the same as the first embodiment. Next, an operation of the print start timing decision part 24 is explained.

Figure 16:
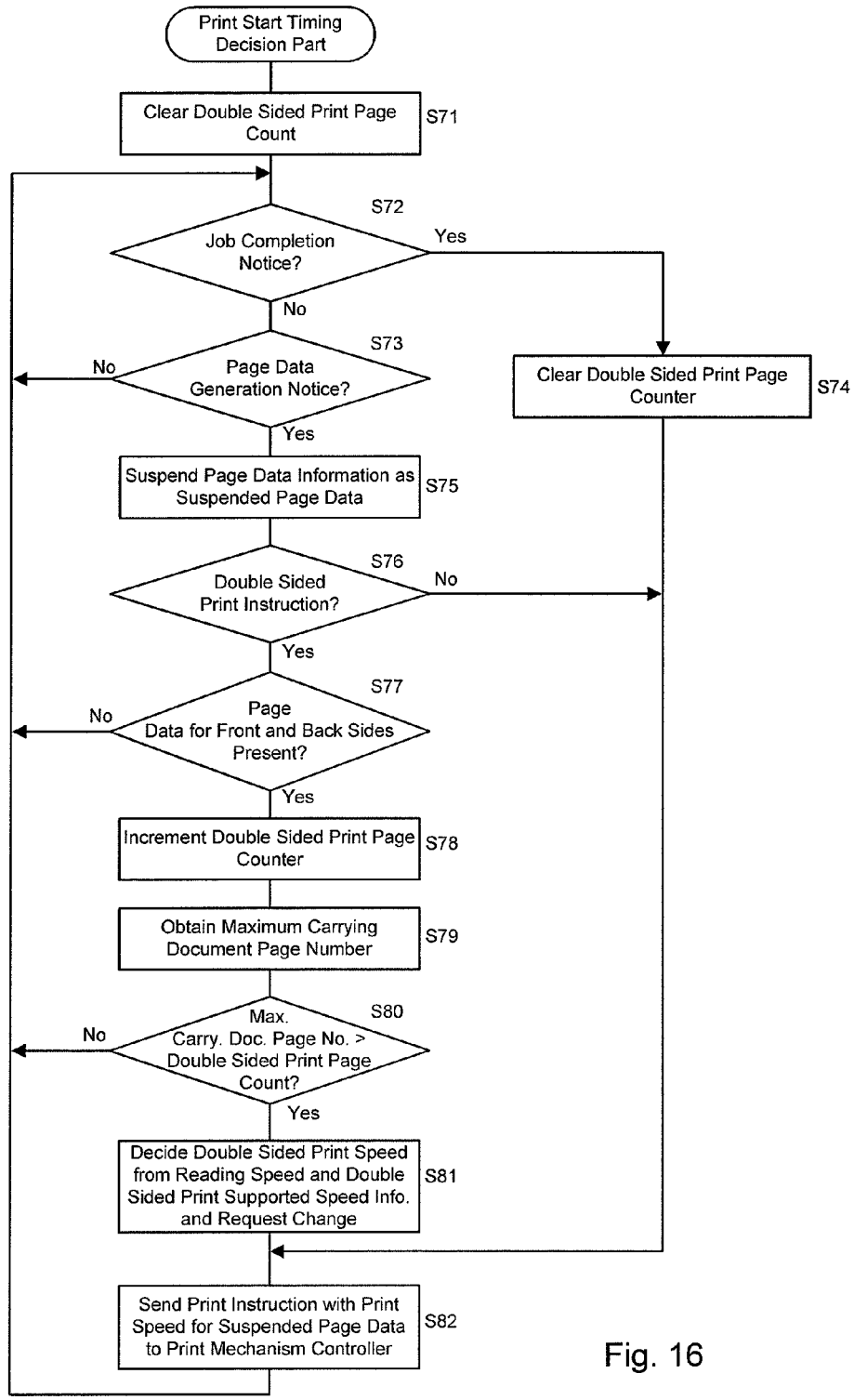
FIG. 16 is a flow diagram illustrating an operation of a print start timing decision part according to the third embodiment of the present application.

FIG. 16 is a flow diagram illustrating an operation of the print start timing decision part according to the third embodiment of the present application.

First, the print start timing decision part 24 clears a double sided print page count for initialization (S71).

Next, the print start timing decision part 24 determines whether or not there is a job completion notice from the print page generation monitoring part 23 (S72).

Then, if there is a job completion notice, the process moves to S74. The print start timing decision part 24 clears the double sided print page count (S74) and checks whether or not there is suspended page data. If there is suspended page data, the print start timing decision part 24 requests the print mechanism controller 25 to print the suspended page data and clears information of the suspended page data. That is, the print start timing decision part 24 sends a print instruction with a print speed for the suspended page to the print mechanism controller 25 (S82). Then, the print start timing decision part 24 returns to S72.

If there is no job completion notice upon the determination as to whether or not there is a job completion notice, the process moves to S73. The print start timing decision part 24 determines whether or not there is a page data generation notice from the print page generation monitoring part 23 (S73).

Then, if there is no page data generation notice, the print start timing decision part 24 returns to S72.

If there is a page data generation notice upon the determination as to whether or not there is a page data generation notice, the process moves to S75. The print start timing decision part 24 registers the information of the page data, generation of which is notified, as the suspended page data (S75).

Next, the print start timing decision part 24 refers to the print condition and determines whether or not the print condition is a double sided print instruction (S76).

Then, if the print condition is not a double sided print instruction, that is, if the print condition is a single sided print instruction, the process moves to S82. The print start timing decision part 24 checks whether or not there is suspended page data. If there is suspended page data, the print start timing decision part 24 requests the print mechanism controller 25 to print the suspended page data and clears information of the suspended page data. That is, the print start timing decision part 24 sends a print instruction with the print speed for the suspended page data to the print mechanism controller 25 (S82) and returns to S72.

If the print condition is the double sided print instruction upon the determination as to whether the print condition is a double sided print instruction, the process moves to S77. The print start timing decision part 24 determines whether or not all of the page data for the front side and the back side is present, that is, whether or not the front and back pages are present (S77).

Then, if the page data for the front side and the back side is not present, the print start timing decision part 24 returns as is to S72.

If the page data for the front side and the back side is present upon the determination as to whether or not the page data for the front side and the back side is present, the process moves to S78. The print start timing decision part 24 increments the double sided print page count (S78).

Next, the print start timing decision part 24 obtains the maximum carrying document page number from the maximum document page number decision part 26 (S79).

Next, the print start timing decision part 24 compares the obtained maximum carrying document page number and the double sided print page count and determines whether or not the double sided print page count is greater than the maximum carrying document page number (S80).

If the double sided print page count is greater than the maximum carrying document page number, the process moves to S81. The print start timing decision part 24 obtains information of the double sided print speed from the double sided print speed decision part 95 and designates the double sided print speed to the print mechanism controller 25. That is, the print start timing decision part 24 decides the double sided print speed from the reading speed and the double sided print supported speed information and instructs the change (S81).

Next, the print start timing decision part 24 checks whether or not there is suspended page data. If there is suspended page data, the print start timing decision part 24 requests the print mechanism controller 25 to print the suspended page data and clears information of the suspended page data. That is, the print start timing decision part 24 sends a print instruction with the print speed for the suspended page data to the print mechanism controller 25 (S82) and returns to S72.

If the double sided print page count is greater than the maximum carrying document page number upon the determination as to whether the double sided print page count is greater than the maximum carrying document page number, the print start timing decision part 24 returns as is to S72.

Next, an operation of the double sided print speed decision part 95 is explained.

Figure 17:
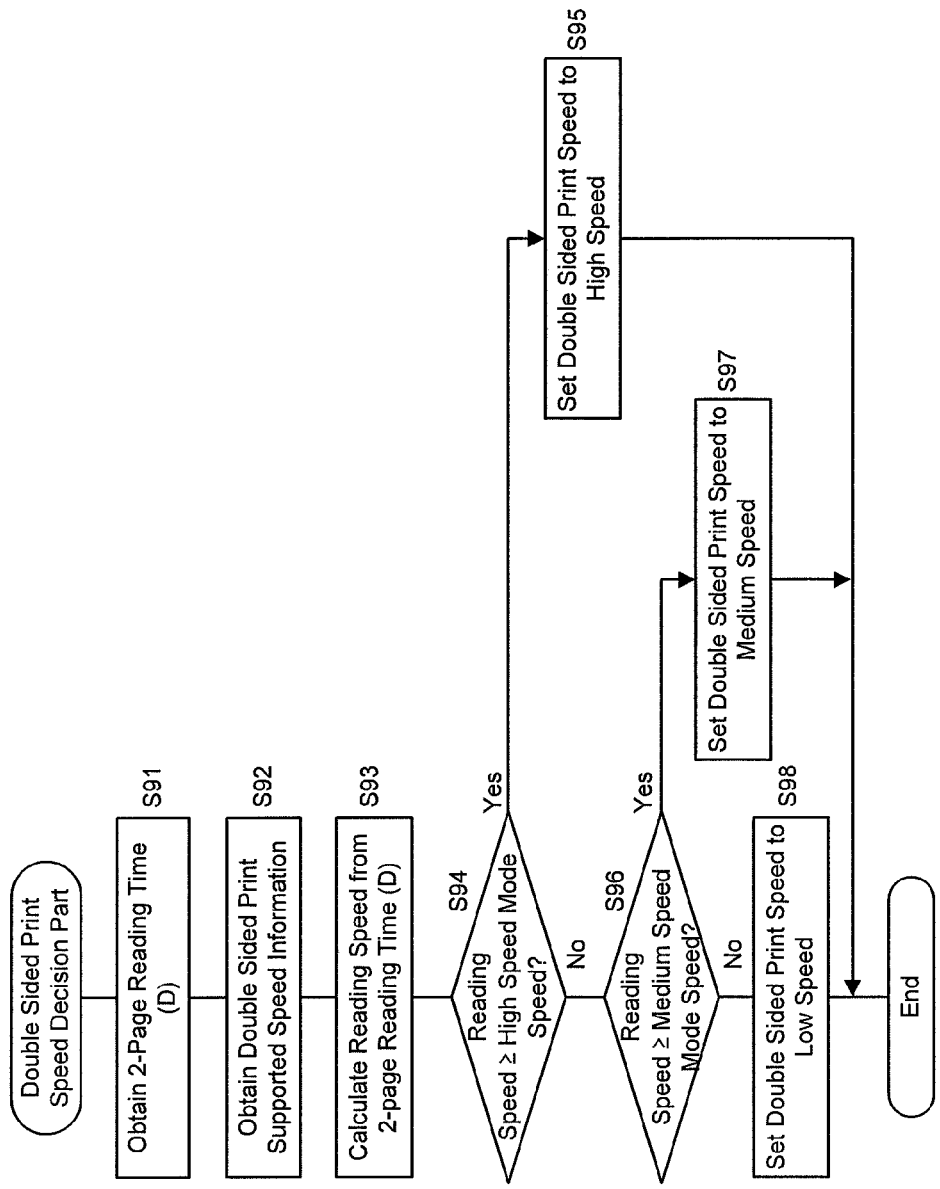
FIG. 17 is a flow diagram illustrating an operation of a double sided print speed decision part according to the third embodiment of the present application.

FIG. 17 is a flow diagram illustrating an operation of the double sided print speed decision part 95 according to the third embodiment of the present application.

First, the double sided print speed decision part 95 obtains 2-page reading time (D) from the reading speed calculation part 91 (S91).

Next, the double sided print speed decision part 95 obtains a list of supported print speeds at the time of double printing from the double sided print speed changing part 96. That is, the double sided print supported speed information is obtained (S92).

Next, the double sided print speed decision part 95 calculates the reading speed, which defines the number of pages that can be read per minute, is calculated from the obtained 2-page reading time (D) based on the following Equation (6) (S93).

$$60 \text{ [sec]} \div 2\text{-Page Reading Time}(D) \qquad \text{Equation (6)}$$

Next, the double sided print speed decision part 95 compares the calculated reading speed and the high speed mode speed in the obtained double sided print supported speed information and determines whether or not the reading speed is equal to or greater than the high speed mode speed (S94).

If the reading speed is equal to or greater than the high speed mode speed, the process moves to S95. The double sided print speed decision part 95 decides to designate the high speed mode as the instruction at the time of double sided printing. That is, the double sided print speed is set to high speed (S95).

If the reading speed is not equal to or greater than the high speed mode speed upon the determination as to whether the reading speed is equal to or greater than the high speed mode speed, the process moves to S96. The double sided print speed decision part 95 compares the calculated reading speed and the medium speed mode speed in the obtained double sided print supported speed information and determines whether or not the reading speed is equal to or greater than the medium speed mode speed (S96).

If the reading speed is equal to or greater than the medium speed mode speed, the process moves to S97. The double sided print speed decision part 95 decides to designate the medium speed mode as the instruction at the time of double sided printing. That is, the double sided print speed is set to medium speed (S97).

If the reading speed is equal to or greater than the medium speed mode speed upon the determination as to whether the reading speed is equal to or greater than the medium speed mode speed, the process moves to S98. The double sided print speed decision part 95 decides to designate the low speed mode as the instruction at the time of double sided printing. That is, the double sided print speed is set to low speed (S98).

As described above, in the present embodiment, by changing the double sided print speed in response to the reading speed for the document 31, the second double sided print operation is not shifted to the first double sided print operation even if the reading speed for the document 31 becomes slower than a standard double sided print speed depending on the reading condition. Therefore, free running of the image forming apparatus 72 is prevented at the time of double sided printing. Therefore, the power consumption is further suppressed, and thereby the life of the consumables and device is further extended compared to the first embodiment.

Moreover, the first to third embodiments are explained using a switch-back type mechanism as the double sided reading mechanism for the reading mechanism 11. However, a one-path type reading mechanism can also be used.

Furthermore, in the third embodiment, the double sided reading operation is explained. However, a single sided reading operation may also be used.

Aspects of the present application are not limited to the embodiments described above, and various changes and modifications are available without departing from the scope of the invention.

What is claimed is:

1. An image forming apparatus, comprising:
a reading mechanism that includes a document reading part that reads an image of a document;
a print mechanism that includes an image forming part that forms the image on a print medium and that is capable of performing double sided printing to form images on front and back sides of the print medium in a first double sided print mode and a second double sided print mode in which a distance between print media is set shorter than the first double sided print mode;
a maximum print medium number decision part that decides a number of pages of the print media that are carried simultaneously on a medium carrying path of the print mechanism at a time of the double sided printing;
a memory part that stores image data of the document read by the document reading part;
a print data editing part that generates print data to be printed on the print media from the image data stored in the memory part;
a print page generation monitoring part that monitors a page count of the print data generated by the print data editing part;
a print start timing decision part that decides print start timing for printing a page of the print data that is to be printed first based on the number of pages of the print media decided by the maximum print medium number decision part and the page count of the print data monitored by the print page generation monitoring part; and
a print mechanism controller that starts printing of the print data based on the print start timing determined by the print start timing decision part, wherein
the print start timing decision part increments a double sided print page count for each two page counts of the print data generated by the print data editing part, and
the print start timing decision part decides that it has reached the print start timing for the print data when the number of pages of the print media decided by the maximum print medium number decision part becomes less than the incremented double sided print page count.

2. The image forming apparatus of claim 1, wherein
the print mechanism performs the double sided printing in the first double sided print mode when the print data of the front and back sides for a second print medium is not present after printing a first side of a first print medium but before printing a second side of the first print medium, and
the print mechanism performs the double sided printing in the second double sided print mode when the print data of the front and back sides for the second print medium is present after printing the first side of the first print medium but before printing the second side of the first print medium.

3. The image forming apparatus of claim 1, wherein
the maximum print medium number decision part decides the number of pages of the print media that are carried simultaneously on the medium carrying path of the print mechanism by determining whether or not a size of the print medium to be printed is smaller than a distance from a medium carrying roller to a medium monitoring sensor in the medium carrying path.

4. An image forming apparatus that is capable of performing double sided printing on print media, comprising:
a generation part that generates print data from received data;
a monitoring part that monitors a page count of the print data generated by the generation part;
a decision part that decides print start timing for printing a page of the print data that is to be printed first based on a number of pages of the print media that can be simultaneously carried inside the image forming apparatus and the page count of the print data; and
a print part that starts the double sided printing of the print data based on the print start timing decided by the decision part, wherein
the decision part decides that it has reached the print start timing and instructs the print part to start the double sided printing of the print data when $M \leq N/2$ is satisfied, where the number M is the number of pages of the print media that can be simultaneously carried inside the image forming apparatus, and the number N is the page count of the print data.

5. The image forming apparatus of claim 4, wherein
the print part suspends the starting of the double sided printing of the print data until it has reached the print start timing.

6. The image forming apparatus of claim 4, wherein
the print part suspends the starting of the double sided printing of the print data until $M \leq N/2$ is satisfied.

* * * * *